June 28, 1966 L. H. MORIN 3,257,791
TRAVELER INCLUDING WEAR RESISTANT INSERT
Original Filed Aug. 22, 1962
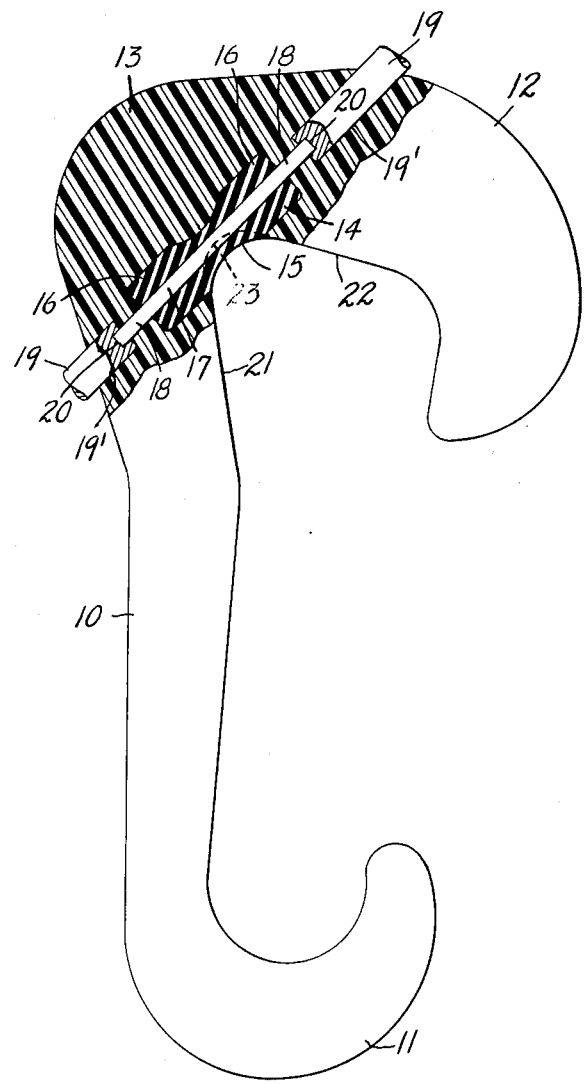
INVENTOR.
LOUIS H. MORIN
BY
Burgers, Ryan & Huk
ATTORNEYS

United States Patent Office 3,257,791
Patented June 28, 1966

3,257,791
TRAVELER INCLUDING WEAR RESISTANT INSERT
Louis H. Morin, Bronx, N.Y., assignor to Coats & Clark Inc., New York, N.Y., a corporation of Delaware
Original application Aug. 22, 1962, Ser. No. 218,732. Divided and this application May 18, 1965, Ser. No. 456,642
3 Claims. (Cl. 57—125)

This application constitutes a division of my application Serial No. 218,732, filed August 22, 1962.

This invention relates to travelers having a wear resistant element of thermosetting material of predetermined contour pre-molded on a reinforcing wire and then the plastic traveler molded upon the insert in a manner to expose at least part of the wear resistant element in the large hook end portion of the traveler.

The novel features of the invention will be best understood from the following description, when taken together with the accompanying drawing, in which certain embodiments of the invention are disclosed and, in which, the separate parts are designated by suitable reference characters and, in which, the drawing illustrates an enlarged side view of a traveler embodying my invention, with part of the construction in section in diagrammatically illustrating the traveler with a wear resistant element therein.

In the accompanying drawing, I have illustrated one adaptation of a traveler. In the drawing, 10 represents the shank of the traveler having a small hook end 11 and a large hook end 12 joining the shank in a rounded portion, as at 13. The body of the traveler is formed from molded plastic material, as indicated by the sectional portion thereof, and any suitable type of material can be employed such, for example, as nylon, Delrin or the like.

At 14 I have shown a more or less hourglass form of wear resistant element by virtue of the rounded recessed central portion 15 and the extended larger diameter ends 16. The recessed portion 15 forms at the inner portion of the rounded part 13 of the traveler, where it is exposed, the desirable wear resistant surface in the resulting traveler.

In constructing my device, the element 14 is pre-molded upon a wire or similar core 17, with the ends 18 of the core extending beyond the ends 16 of the element 14, as clearly illustrated, so that, in formation of the resulting traveler, the insert element 14 can be positioned in the molds forming the traveler proper by the use of supporting pins 19, recessed, as seen at 20, to receive the ends 18 in definite location of the insert element 14 in the molds, preparatory to forming the traveler upon the insert 14, in the manner illustrated, so that surfaces 21 and 22 of the hook end 12 of the traveler will properly aline and register with the surface of the recess 15 for exposure of the resistant element in the manner clearly shown. It will be understood that, in the present illustration, the pins 19, which are actually core pins, are in the position they assume in the mold which forms the traveler and these pins 19 are withdrawn from the traveler in the operation of removing the traveler from the cavity of the molds forming the same and this removal will leave in the traveler apertures, as at 19'.

It will, further, be apparent that the contour of the insert element 14 definitely positions the element in the traveler body and that the surface of the recessed portion 15 of the element is exposed to sides of the rounded portion 13, as diagrammatically illustrated, in part, by the dotted line 23. In the construction illustrated, the element 14 is formed of thermosetting rubber, or rubber compositions, synthetic or otherwise. However, any type and kind of thermosetting plastics providing wear resistant properties can be employed.

Having fully described my invention, what I claim as new and desire to secure by Letters Patent is:

1. A traveler comprising a molded plastic body having a hook end, a wear resistant element of thermosetting plastic material constituting an insert in said hook end for exposure of part of the element on inner surfaces of said hook end, said element including a wire reinforcement on the axial center of said element with an end thereof projecting from said element and thus forming a pin end, and said pin end of the element providing a means for positioning of the element in the hook end portion in the process of molding said traveler.

2. A traveler as defined in claim 1, wherein said pin end constitutes part of said reinforcement and is arranged longitudinally of said element.

3. A traveler comprising a molded plastic body having a hook end, a wear resistant element of thermosetting plastic material constituting an insert in said hook end for exposure of part of the element on inner surfaces of said hook end, said element including a continuous wire reinforcement passing through the axial center of said element with the ends thereof projecting from said element and thus forming pin ends, and said pin ends of the element providing means for definite positioning of the element in the hook end portion in the process of molding said traveler.

References Cited by the Examiner

UNITED STATES PATENTS

| 2,326,829 | 8/1943 | Camp | 57—125 X |
|---|---|---|---|
| 2,749,698 | 6/1956 | Stahli | 57—125 |
| 2,918,780 | 12/1959 | Bowen | 57—125 |
| 2,942,407 | 6/1960 | Morin | 57—125 |
| 2,961,826 | 11/1960 | Morin | 57—125 |
| 2,966,026 | 12/1960 | Morin | 57—125 |
| 2,999,276 | 9/1961 | Morin | 57—125 X |

STANLEY N. GILREATH, *Primary Examiner.*

MERVIN STEIN, *Examiner.*

J. PETRAKES, *Assistant Examiner.*